3,170,717
TRAILER HITCH ATTACHMENT FOR AUTOMOBILE BUMPERS

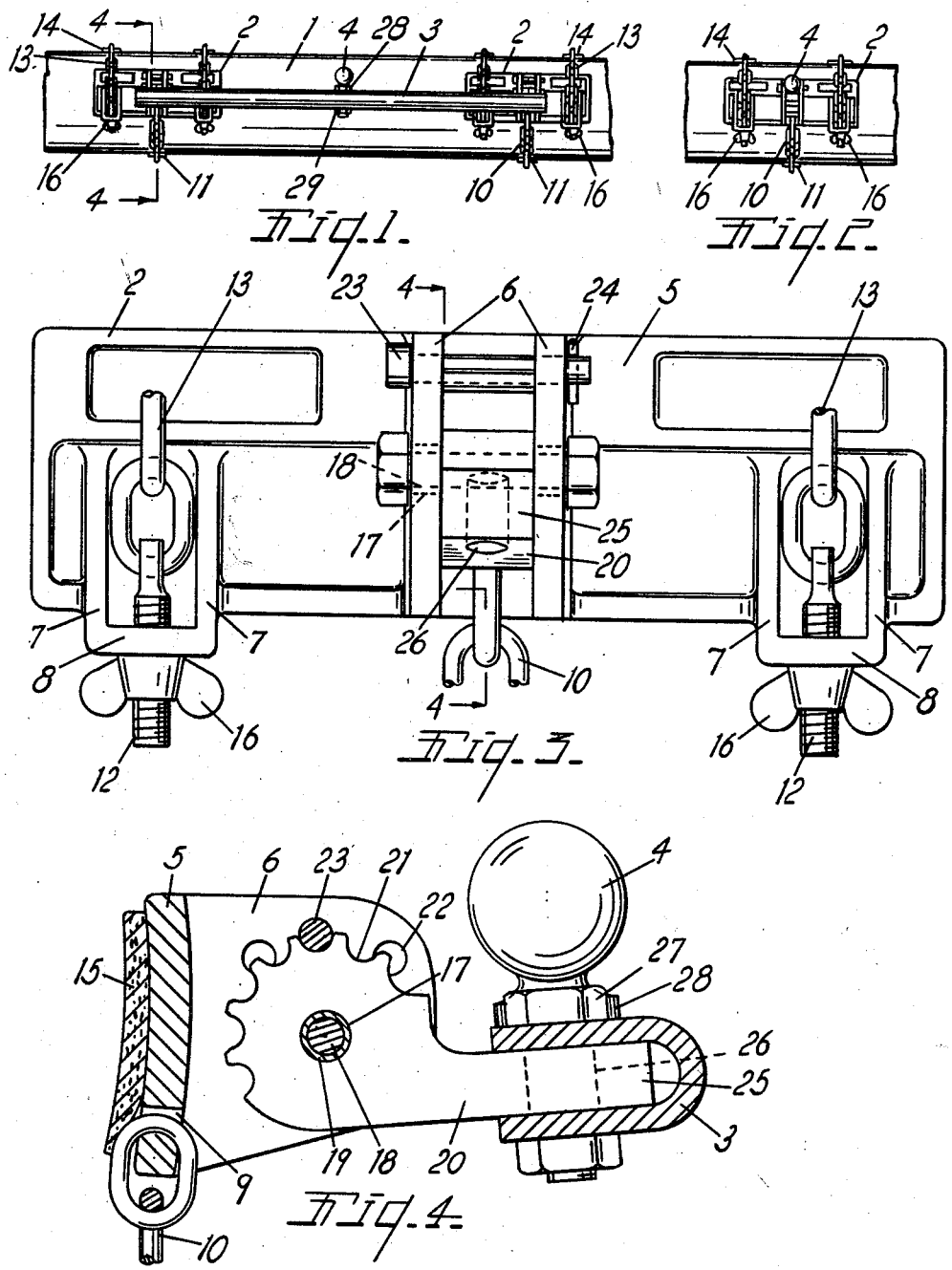

Ernest G. Hellenga, Three Oaks, Mich., assignor to Pilot Incorporated, Battle Creek, Mich., a corporation of Michigan
Filed Nov. 26, 1963, Ser. No. 326,054
1 Claim. (Cl. 280—490)

This invention relates to improvements in trailer hitch attachment for automobile bumpers. The principal objects of this invention are:

First, to provide a novel form of attachment for the bumpers of automobiles which will connect a conventional ball hitch element to the bumper and permit adjustment of the elevation of the ball element to accommodate different trailers and different bumper heights.

Second, to provide a trailer hitch attachment which can be adapted for different sizes or weights of trailers to be handled to distribute the towing load over different lengths of the automobile bumper.

Third, to provide a bumper engaging clamp which is simple and inexpensive and at the same time of strong construction well adapted to receive the towing load of a trailer and transmit the load to the bumper of a towing car.

Fourth, to provide a bumper attaching clamp which can be economically formed as a steel casting and adapted for adjustment of the trailer connection with a minimum of machining.

The drawings, of which there is one sheet, illustrate a highly practical form of the bumper attaching clamp of the invention adapted in two forms for single or double mounting of the ball hitch element of a trailer towing connection.

FIG. 1 is a rear elevational view showing a portion of a bumper with two of the bumper engaging clamps mounted thereon and jointly supporting a connecting bar and trailer hitch ball therebetween.

FIG. 2 is a rear elevational view of a single bumper engaging clamp of the invention with the ball coupling element of a trailer hitch attached directly thereto.

FIG. 3 is a fragmentary rear elevational view of the bumper engaging clamp of the invention with the ball hitch supporting bar of FIG. 1 and the ball element of FIG. 2 omitted.

FIG. 4 is a fragmenatry transverse cross sectional view taken along the plane of the lines 4—4 in FIGS. 1 and 3.

The trailer towing assembly shown in FIG. 1 illustrates a portion of the rear bumper 1 of an automobile having a pair of ataching clamp bodies 2—2 secured thereto in spaced relation as will be described in greater detail presently. A transverse towing bar 3 is connected between the bumper clamp bodies and carries a standard ball element 4 near its center for attachment to the socket connection commonly found on trailers.

The towing assembly shown in FIG. 2 consists of a single bumper engaging clamp body 2 with the ball element 4 attached directly thereto. The structure in FIG. 2 will be used for towing lighter trailers than the combination in FIG. 1 which has double the connecting mechanism to the bumper.

The bumper engaging and clamping bodies 2 consist of a base plate 5 of cast steel or other suitable material with rearwardly projecting central parallel flanges 6 and downwardly and rearwardly projecting pairs of flanges 7—7 near each end. The lower edges of the flanges 7 are connected by a cross plate 8 which is integral with the casting. Between the central flanges 6 the base plate 5 is provided with an opening or hole 9 (See FIG. 4) through which the upper end of a lower clamp chain 10 is engaged. The chain 10 extends downwardly to a lower bumper engaging hook 11 which is engageable under the lower edge of the bumper.

The cross flanges or plate 8 between the flanges 7 are drilled or cored to receive the threaded portion of adjusting screws 12 which have upper clamp chains 13 connected thereto and extended upwardly to upper hooks 14 engaged over the upper edge of the bumper. Desirably flexible or wear resistant pads 15 are applied to the front side of the plate 5 of the bumper engaging clamp. Thumb nuts 16 on the screws 12 permit the upper chains 13 to be tightened drawing the plates of the clamp bodies firmly against the rear surface of the bumper.

The central flanges 6 of the clamp bodies define a central hole 17 through which a pivot and clamp bolt 18 projects to span the distance between the plates 6. Bushings 19 may be provided around the bolt in the holes 17. Adjustably mounted on the center of the pivot bolt 18 is a support block 20 having a semi-circular portion with peripheral notches 21 formed therein around a segment of the rear end of the block. The notches 21 are concentric about the pin 18 which passes through the center of the supporting block and are spaced angularly by a distance of the order of 30°. The rearwardly projecting plates 6 are provided with three angularly spaced holes 22 which are also centered around the pin 18 but are spaced angularly by a distance approximating 42° so that any given notch 21 may be brought into registry with either of the three holes 22 by rotating the support block on the pivot pin 18.

A retaining pin 23 is selectively passed through one of the holes 22 and one of the notches 21 to hold the support block against rotation on the bumper engaging clamp body. The pin 23 is retained in place by the cotter pin 24 shown in FIG. 3.

The support body 20 has a rearwardly projecting end 25 of generally rectangular cross section with flat upper and lower surfaces which define a generally upright hole or opening 26. The angle of the rearwardly projecting end 25 can be adjusted by removing the pin 23 and rotating the support block to the desired position. In the double clamp body combination shown in FIG. 1 a draw bar or towing bar 3 of forwardly opening U-shaped cross section is fitted over the rearwardly projecting ends 25 and secured in place by bolts 27. The trailer hitch ball element 4 as previously described is mounted on the center of the tow bar 3. When the single bumper engaging clamp plate 2 is used the ball element 4 and its shoulder 28 is applied directly to the rearwardly projecting end 25 of the support block by passing the shank of the ball element through the hole 26 and securing it in place by the nut 29 on the bottom of the ball element.

In both the single and double bumper clamp body assemblies illustrated the pivot bolt 18 is drawn tight against the flanges or plates 6 to clamp the plates against the sides of the support block and assist the pin 23 in holding the support block at the desired angle. With either arrangement it is relatively simple to adjust the elevation of the ball element 6 relative to the bumper on which it is supported to match the desired height of the socket on the trailer to be towed. Since the towing element is a ball, a wide angular variation in the position of the ball relative to the bumper is permissible without interfering with the ability of the ball to engage the socket on the trailer being towed.

What is claimed as new is:

A bumper hitch comprising a base plate adapted to be abutted against a bumper,
three pairs of parallel flanges projecting rearwardly from said plate at the ends and middle thereof,
a first anchor chain connected to said plate between the middle pair of flanges and extending downwardly therefrom, cross flanges connecting the bottoms of the end pairs of flanges and defining generally vertical holes, other anchor chains having bolts on one end passed through said holes with nuts on the bolts on the under sides of said cross flanges to extend around the top of a bumper, said chains having bumper engaging hooks connected to their ends, a support block rockably positioned between the middle one of said pairs of flanges, a horizontal bolt supporting said block from its pair of flanges, an arcuate sector on said block centered about said bolt and having transverse retaining openings formed therethrough in angularly spaced relation about said horizontal bolt, pairs of holes formed in said flanges supporting said block and spaced angularly about said horizontal bolt, a pin passed selectively through said pairs of holes and one of said retaining openings to hold said block at a selected angle relative to its base plate, a rearwardly projecting end on said block, and a ball hitch element supported from said rearwardly projecting end.

References Cited by the Examiner

UNITED STATES PATENTS

| | | | |
|---|---|---|---|
| 2,610,070 | 9/52 | Klein | 280—502 |
| 3,061,333 | 10/62 | Sudeikus | 280—490 |

A. HARRY LEVY, *Primary Examiner.*